(12) United States Patent
Foser

(10) Patent No.: US 10,780,508 B2
(45) Date of Patent: Sep. 22, 2020

(54) SETTING TOOL FOR A DROP-IN ANCHOR

(71) Applicant: Hilti Aktiengesellschaft, Schaan (LI)

(72) Inventor: Roland Foser, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 1144 days.

(21) Appl. No.: 14/442,895

(22) PCT Filed: Nov. 13, 2013

(86) PCT No.: PCT/EP2013/073712
§ 371 (c)(1),
(2) Date: May 14, 2015

(87) PCT Pub. No.: WO2014/076125
PCT Pub. Date: May 22, 2014

(65) Prior Publication Data
US 2015/0290722 A1   Oct. 15, 2015

(30) Foreign Application Priority Data

Nov. 19, 2012   (DE) .................. 10 2012 221 114

(51) Int. Cl.
*B23B 51/02* (2006.01)
*B23B 51/08* (2006.01)
(Continued)

(52) U.S. Cl.
CPC .............. *B23B 51/08* (2013.01); *B23B 51/02* (2013.01); *B25B 31/00* (2013.01); *B25D 17/005* (2013.01);
(Continued)

(58) Field of Classification Search
CPC . B25D 17/005; B25F 1/00; B25F 3/00; B25F 3/04; B25B 31/00; B25B 51/08;
(Continued)

(56) References Cited

U.S. PATENT DOCUMENTS 5,030,043 A * 7/1991 Fischer ............... B25D 17/005
                                                          279/145
5,313,680 A * 5/1994 Ringler .................... B25F 3/00
                                                          7/138

(Continued)

FOREIGN PATENT DOCUMENTS

CN     1176351     3/1998
CN     1795336     6/2006

(Continued)

OTHER PUBLICATIONS

Hilti HDI+COMBOS Auto Setting Tool and Anchors (extracted from Hilti Website).*

(Continued)

*Primary Examiner* — Monica S Carter
*Assistant Examiner* — Mahdi H Nejad
(74) *Attorney, Agent, or Firm* — Davidson, Davidson & Kappel, LLC

(57) ABSTRACT

The setting tool (1) has a first part (2) for driving in a drop-in anchor and a second part (3), placeable on the first part along an axis (8), for drilling a drill hole for the drop-in anchor. The first part (2) has an insertion end (5) for a percussive portable power tool, a plunger (6) having an impact surface (12) and a piece (16) of a rotary coupling. The second part (3) has a slip-on sleeve (20), which coaxially surrounds the plunger (6) and bears against the impact surface (12) of the plunger (6), a counterpart (33) for the rotary coupling and a drill bit (23) permanently connected to the slip-on sleeve (20).

8 Claims, 2 Drawing Sheets

(51) Int. Cl.
  *B25D 17/00* (2006.01)
  *B25D 17/02* (2006.01)
  *B25B 31/00* (2006.01)
  *B25B 21/00* (2006.01)

(52) U.S. Cl.
  CPC ...... *B25D 17/02* (2013.01); *B23B 2260/0482* (2013.01); *B25B 21/007* (2013.01); *B25D 2250/051* (2013.01); *B25D 2250/111* (2013.01)

(58) Field of Classification Search
  CPC ............... B25B 21/007; B25B 23/0035; Y10T 279/17008; B23B 51/08
  USPC .......... 411/57.1, 45; 7/158, 165; 279/14, 17; 408/238–240, 239 R
  See application file for complete search history.

(56) References Cited

U.S. PATENT DOCUMENTS

| | | | | |
|---|---|---|---|---|
| 5,409,333 | A * | 4/1995 | Hu | B25B 21/007 279/14 |
| 5,711,043 | A * | 1/1998 | Crawford | E21B 17/02 7/158 |
| 6,012,358 | A | 1/2000 | Lins et al. | |
| 6,033,162 | A * | 3/2000 | Uebele | B25B 21/007 279/144 |
| 6,302,409 | B1 * | 10/2001 | Gutsche | B23B 31/1071 279/128 |
| 8,061,000 | B2 * | 11/2011 | Santamarina | B25B 31/00 173/128 |
| 8,545,140 | B2 * | 10/2013 | Burn | B23B 51/0009 408/211 |
| 8,602,285 | B2 * | 12/2013 | Santamarina | B23B 51/08 173/128 |
| 8,956,091 | B2 * | 2/2015 | Nonaka | B23B 31/11 408/233 |
| 2001/0029634 | A1 * | 10/2001 | Lamarre | B25B 21/007 7/158 |
| 2005/0105983 | A1 * | 5/2005 | Hernandez, Jr. | B23B 51/08 408/239 R |
| 2006/0228181 | A1 | 10/2006 | Kozak | |
| 2006/0263167 | A1 | 11/2006 | Linka et al. | |
| 2007/0074350 | A1 * | 4/2007 | Dreps | B23B 51/08 7/158 |
| 2008/0023924 | A1 * | 1/2008 | Chiang | B23B 31/008 279/14 |
| 2009/0180839 | A1 * | 7/2009 | Kardas | B25B 23/141 405/259.1 |
| 2009/0302088 | A1 * | 12/2009 | Santamarina | B25B 31/00 227/139 |
| 2010/0135741 | A1 * | 6/2010 | Probst | B23B 51/02 408/230 |
| 2010/0299844 | A1 * | 12/2010 | Armiento | B23B 51/08 7/158 |
| 2012/0017421 | A1 * | 1/2012 | Bland | F16B 13/0841 29/525.05 |
| 2012/0308326 | A1 * | 12/2012 | Gillis | F16B 13/002 411/57.1 |
| 2013/0161038 | A1 * | 6/2013 | Prunean | B25B 21/007 173/1 |
| 2015/0101177 | A1 * | 4/2015 | Hall | B23B 51/08 29/525.11 |

FOREIGN PATENT DOCUMENTS

| | | |
|---|---|---|
| DE | 19904849 | 8/2000 |
| EP | 0425358 | 5/1991 |
| EP | 0955130 A2 | 11/1999 |
| EP | 1 281 481 | 2/2003 |
| JP | 2008119769 | 5/2008 |

OTHER PUBLICATIONS

Smart DI+Dropin Anchor System (extracted form youtube)—Oct. 26, 2011.*

Merriam-Webster (permanent).*

* cited by examiner

SETTING TOOL FOR A DROP-IN ANCHOR

The present invention relates to a setting tool for machine setting of a drop-in anchor in stone or mineral construction materials.

The drop-in anchor has at its tip a conical expansion body and a sleeve, which initially rests loosely on the expansion body. The user sets the drop-in anchor with the tip ahead into a borehole whose inside diameter corresponds to the diameter of the sleeve. The sleeve is then driven into the borehole with the aid of hammer strokes on the expansion body and is thereby jammed against the wall of the borehole.

BACKGROUND

A variety of different auxiliary means for setting the drop-in anchor are known. EP 0955130 A2 describes, among other things, a setting tool based on a hood placed on a drill bit. The user initially drills out the borehole by using a drill bit and an associated portable electrical power tool having a percussive function. The performance of the drill bit of the setting tool is not different from that of traditional drill bits, and in particular neither the torque nor the percussive power is affected. The user next puts the hood over the drill bit. The hood is supported on a shoulder on the shank of the drill bit. The tip of the hood is provided with an impact surface. The user utilizes the percussive function of the portable power tool and drives the sleeve of the drop-in anchor onto the expansion body indirectly via the drill bit and the hood. The setting tool is used in its one-piece configuration for an activity such as drilling, which requires more power, and in its two-piece configuration for the simpler activity.

SUMMARY OF THE INVENTION

For drilling a borehole for the drop-in anchor, the setting tool according to the present invention has a first part for driving a drop-in anchor and a second part, which may be placed on the first part, along an axis. The first part includes a shank for a percussive portable power tool, a plunger including an impact surface and a piece of a rotary coupling. The second part includes a slip-on sleeve, which surrounds the plunger coaxially and contacts the impact surface of the plunger, a counterpart to the rotary coupling and a drill bit, which is permanently connected to the slip-on sleeve.

The setting tool inverts the arrangement of the drilling tool and the driving tool in comparison with that known from EP 0955130 A2 without any significant restrictions with regard to the drilling performance. Contact of the plunger with the slip-on sleeve permits conveyance of an impact wave from the shank to the tip of the drill bit on the axis. It has proven necessary to prevent cavities situated on the axis.

One embodiment provides that the first part and the second part contact one another only on the impact surface of the plunger along the axis. The first part contacts the second part via the impact surface situated on the axis. Surfaces of the first part, which lie radially outside of the impact surface, are separated from the second part by a gap along the axis. The impact wave should preferably run only close to the axis, in particular only within a cylindrical space, which is situated coaxially to the axis and has the same cross section as the impact surface, preferably the same shape and surface area. Parasitic secondary channels are interrupted by the gap along the axis.

One embodiment provides that the slip-on sleeve forms a collar, which protrudes radially beyond the drill bit and delimits the depth of the borehole. One embodiment provides that the first part includes a base connecting the shank and the plunger, this base protruding radially beyond the plunger with an end face pointing in the impact direction in order to limit the setting depth. The driving tool and the drilling tool signal to the user, by contact with the substrate, that the driving or drilling has been performed properly.

One embodiment provides that the piece of the rotary coupling includes at least one key surface and the counterpart includes at least one complementary key surface to the key surface.

One embodiment provides that the shank has at least one elongated groove, which runs along the axis and is closed in the impact direction and against the impact direction. The shank is suitable in particular for a percussive portable power tool.

One embodiment provides that the first part includes a base having the same outside diameter as the slip-on sleeve and is characterized by a cylindrical sleeve made of an elastic plastic, which is put over the first part and the second part.

BRIEF DESCRIPTION OF THE DRAWINGS

The following description explains the present invention on the basis of exemplary specific embodiments and figures.

DETAILED DESCRIPTION

Figure 1:
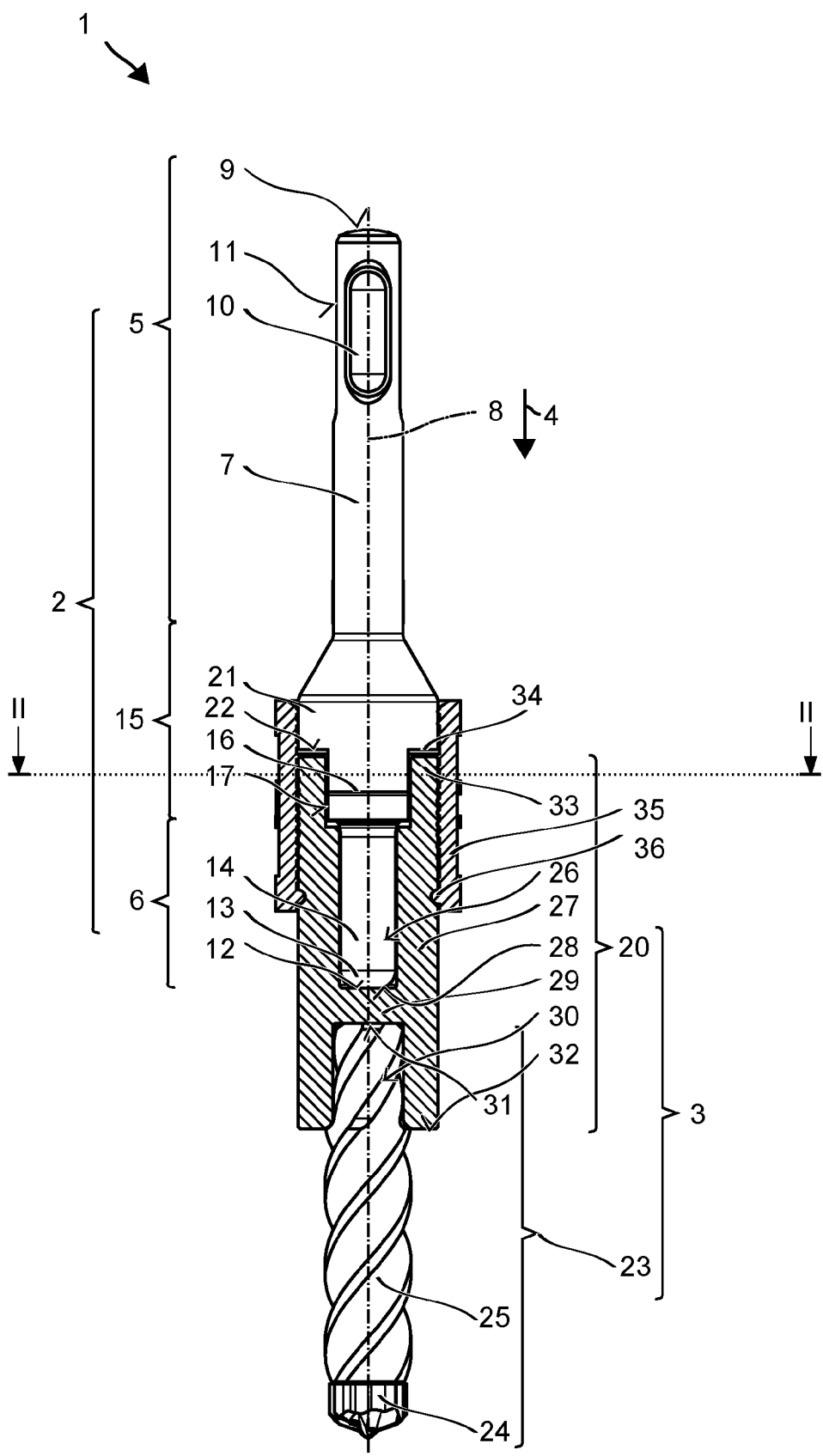
FIG. 1 shows a setting tool.
Figure 2:
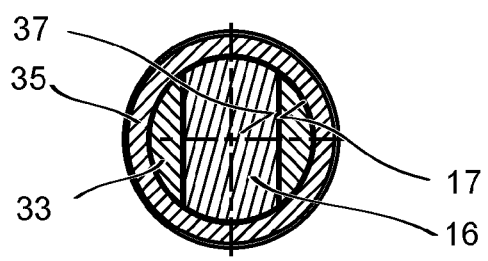
FIG. 2 shows a first embodiment of the coupling between the first and second parts of the setting tool.

FIG. 1 shows a setting tool 1 in a partially truncated side view. FIG. 2 shows a cross section in the plane II-II. The setting tool has a first part 2 and a second part 3, which are shown after being assembled. It is explained below that second part 3 may be pulled away from first part 2 without a tool.

Setting tool 1 is designed for anchors, which are inserted into a fitting borehole by driving an expansion body, a pin, a cone, etc., expanded and clamped it against the borehole wall. The expansion body is typically at the tip of the anchor inserted into the borehole, but for setting tool 1, it may also be situated on the end protruding out of the borehole. The user uses setting tool 1 in its assembled form, as illustrated in FIG. 1, for drilling the borehole. The borehole is drilled using an electric portable power tool. For driving the anchor, the user uses only first part 2, for which the user first pulls second part 3 away from first part 2. In an alternative, which is preferably a strictly chiseling embodiment, the portable power tool is switched to a hammer drilling operation.

First part 2 for driving the anchor has an essentially cylindrical shank 5 and an essentially cylindrical plunger 6, consecutively, in impact direction 4.

Shank 5 is designed for a percussive portable power tool. Shank 5 has an essentially cylindrical shaft 7, including an impact surface 9, which is situated coaxially to axis 8 and faces away from impact direction 4. A lock on the portable power tool may engage in opposing longitudinal grooves 10 in shaft 7. Longitudinal grooves 10 are closed in impact direction 4 and against impact direction 4. Shank 5 is also provided with rotational entrainment grooves 11, which are situated around axis 8, so that they are offset by 90 degrees from longitudinal grooves 10. Rotational entrainment grooves 11 are preferably open against impact direction 4.

Plunger 6 has at its tip 13 an impact surface 12 facing in impact direction 4. Impact surface 12 is situated coaxially to axis 8. The shape of tip 13 may be adapted to the anchor to be set. The exemplary impact surface 12 is curved in the form of a dome; other impact surfaces may be ring-shaped with a central recess. A shaft 14 of plunger 6 including tip 13 is preferably cylindrical or prismatic.

Plunger 6 is connected to shank 5 by an intermediate base 15. These three components are preferably integrally bonded, in particular being manufactured from a single blank.

Figure 3:
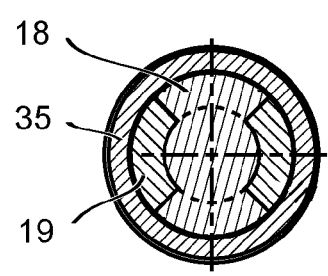
FIG. 3 shows an alternate second embodiment of the coupling between the first and second parts of the setting tool, Unless stated otherwise, the same elements or those having the same function are indicated by the same reference numerals in the figures.

Base 15 has a section, which is not rotationally symmetrical and forms a piece 16 of a rotary coupling (one coupling half). The exemplary embodiment has two planar key surfaces 17 diametrically opposite axis 8. The section may be prismatic, being provided with three, four, six or any other number of flat key surfaces. The section may also have a star-shaped cross section. The rotary coupling may also be formed on base 15 by axially protruding claws 18, which engage in corresponding claws 19 of slip-on sleeve 20 (cf. cross section in the plane II-II shown in FIG. 3).

Base 15 may have an annular collar 21, which protrudes radially beyond plunger 6 and piece 16 of the rotary coupling. Collar 21 has an end face 22 running in impact direction 4, i.e., facing second part 3 and across axis 8. Collar 21 assists the user in driving the anchor. The length of plunger 6, i.e., the axial distance of impact surface 12 from end face 22 of collar 21 is selected to be equal to the setting distance for the anchor. The setting distance is the relative distance for which the expansion body and the sleeve of the anchor must be shifted relative to one another. The user thus recognizes, by the contact of collar 21 with the substrate, that the setting operation has concluded properly.

Second part 3 has a slip-on sleeve 20 and a drill bit 23, both of which are situated coaxially to axis 8.

Drill bit 23 shown here has a drill head 24 made of a hard metal (sintered carbide). The drill head 24, preferably monolithic, has four blades, all made of the hard metal, in a cross shape pointing in impact direction 4. The blades may run at an inclination from the tip to the circumference of the drill head. Along the circumference of drill head 24, blade edges running essentially in parallel to axis 8 are also provided. Drill head 24 is placed on a spiral 25, being soldered or welded in place, for example. Spiral 25 is permanently anchored in slip-on sleeve 20. As an alternative to a monolithic drill head forming the entire end face, drill bit 23 may be provided with a cutting plate made of hard metal, which is inserted into a slot in spiral 25.

Exemplary slip-on sleeve 20 is a cylindrical or prismatic body having a receiving space 26 for plunger 6. Receiving space 26 is formed coaxially to axis 8 and is open against impact direction 4. An exterior wall 27, preferably closed at the circumference, surrounds receiving space 26. Exterior wall 27 preferably has a cylindrical or prismatic exterior contour. A hollow cross section of receiving space 26 is preferably complementary to the cross section of plunger 6. Plunger 6 is preferably guided in receiving space 26 with a small radial clearance. Receiving space 26 is closed by a roof surface 28 in impact direction 4. Slip-on sleeve 20 shown here has a compartment 29 running transversely to exterior wall 27 and defining roof surface 28. The length of receiving space 26 is designed in relation to the length of plunger 6 in such a way that plunger 6 and its impact surface 12 are in contact with roof surface 28 of receiving space 26. Roof surface 28 may be designed to be complementary to impact surface 12, preferably to ensure a point of contact, situated on axis 8, of roof surface 28 with impact surface 12. A particularly efficient transfer of the shock wave, exerted by the portable power tool on shank 5, into the drill head 24, may be achieved in this way. The shock wave is able to propagate through cavities along axis 8 without being disturbed.

Slip-on sleeve 20 has a seat 30 opposite receiving space 26, drill bit 23 being permanently inserted into this seat. Seat 30 may be, for example, an accurately fitting cavity for spiral 25. A bottom 31 of seat 30 is formed by compartment 29. Drill bit 23 rests on bottom 31, with spiral 25 of drill bit 23 preferably contacting bottom 31 at a point situated on axis 8. Spiral 25 may be permanently connected to seat 30 in an integrally bonded or form-fitting manner or in some other way.

Compartment 29 has proven to be advantageous for the manufacture of setting tool 1 but is not absolutely necessary for efficient transfer of the shock wave. Receiving space 26 may be closed directly by drill bit 23. The bottom surface of spiral 25 facing against impact direction 4 forms roof surface 28.

An outside diameter of slip-on sleeve 20 is larger than the diameter of the spiral. An end face 32 of slip-on sleeve 20 pointing in impact direction 4 forms a depth stop during drilling. The axial distance of drill head 24 from end face 32 is coordinated with the length of the anchor.

Slip-on sleeve 20 forms counterpart 33 (the other coupling half) for the rotary coupling with first part 2. Slip-on sleeve 20 extends around piece 16 and has an internal contour complementary to piece 16, or the circumference of slip-on sleeve 20 is provided with axially protruding claws 19. Counterpart 33 may be situated directly in front of receiving space 26 along axis 8.

An end face of slip-on sleeve 20 facing against impact direction 4 lies opposite end face 22 of base 15. The two end faces are separated from one another by a gap 34. Gap 34 is obtained by the dimensioning of the length of receiving space 26 in relation to the length of plunger 6. Gap 34 suppresses a transfer of the shock wave into the radially exterior areas of setting tool 1, in particular into exterior wall 27 of slip-on sleeve 20. The rotary coupling is also designed in such a way that piece 16 and counterpart 33 contact one another only in the circumferential direction and are separated by a gap along axis 8.

A sleeve 35 made of an elastic plastic, for example, a synthetic rubber, connects first part 2 and second part 3 in a force-locking manner. Sleeve 35 is preferably put over slip-on sleeve 20 and base 15. For example, sleeve 35 may be attached with nubs 36 in corresponding recesses on slip-on sleeve 20. Sleeve 35 protrudes sufficiently beyond slip-on sleeve 20 against impact direction 4 to allow gripping of base 15. In the specific embodiment shown here, slip-on sleeve 20 and base 15 have the same cross section. In alternative specific embodiments, the hollow cross section of sleeve 35 along axis 8 may be varied in adaptation to slip-on sleeve 20 and the base. The user may release first part 2 from second part 3 by pulling along axis 8 and overcoming the clamping force and frictional force of sleeve 35 acting radially. Similarly, the user may push two parts 2, 3 together along axis 8.

What is claimed is:
1. A setting tool comprising:
a first part for driving a drop-in anchor; and a second part placeable on the first part along an axis for drilling a borehole for the drop-in anchor, the first part having a shank for a percussive portable power tool, a plunger including an impact surface, and a rotary coupling part, and the second part having a slip-on sleeve, the slip-on sleeve surrounding the plunger coaxially and contacting the impact surface of the plunger, a counterpart to the rotary coupling part and a drill bit permanently connected to the slip-on sleeve;

wherein the first part and the second part come into contact along the axis only at the impact surface of the plunger.

2. A setting tool comprising:

a first part for driving a drop-in anchor; and a second part placeable on the first part along an axis for drilling a borehole for the drop-in anchor, the first part having a shank for a percussive portable power tool, a plunger including an impact surface, and a rotary coupling part, and the second part having a slip-on sleeve, the slip-on sleeve surrounding the plunger coaxially and contacting the impact surface of the plunger, a counterpart to the rotary coupling part and a drill bit permanently connected to the slip-on sleeve;

wherein the first part contacts the second part via the impact surface situated on the axis, and surfaces of the first part situated radially outside of the impact surface are separated from the second part by a gap along the axis.

3. A setting tool comprising:

a first part for driving a drop-in anchor; and a second part placeable on the first part along an axis for drilling a borehole for the drop-in anchor, the first part having a shank for a percussive portable power tool, a plunger including an impact surface, and a rotary coupling part, and the second part having a slip-on sleeve, the slip-on sleeve surrounding the plunger coaxially and contacting the impact surface of the plunger, a counterpart to the rotary coupling part and a drill bit permanently connected to the slip-on sleeve;

wherein the slip-on sleeve forms a collar protruding radially beyond the drill bit and delimiting a depth of the borehole.

4. A setting tool comprising:

a first part for driving a drop-in anchor; and a second part placeable on the first part along an axis for drilling a borehole for the drop-in anchor, the first part having a shank for a percussive portable power tool, a plunger including an impact surface, and a rotary coupling part, and the second part having a slip-on sleeve, the slip-on sleeve surrounding the plunger coaxially and contacting the impact surface of the plunger, a counterpart to the rotary coupling part and a drill bit permanently connected to the slip-on sleeve;

wherein the first part has a base connecting the shank and the plunger, the base protruding radially beyond the plunger with an end face facing in an impact direction to delimit a setting depth.

5. A setting tool comprising:

a first part for driving a drop-in anchor; and a second part placeable on the first part along an axis for drilling a borehole for the drop-in anchor, the first part having a shank for a percussive portable power tool, a plunger including an impact surface, and a rotary coupling part, and the second part having a slip-on sleeve, the slip-on sleeve surrounding the plunger coaxially and contacting the impact surface of the plunger, a counterpart to the rotary coupling part and a drill bit permanently connected to the slip-on sleeve;

wherein the rotary coupling part includes at least one key surface, and the counterpart includes at least one complementary key surface to the at least one key surface.

6. A setting tool comprising:

a first part for driving a drop-in anchor; and a second part placeable on the first part along an axis for drilling a borehole for the drop-in anchor, the first part having a shank for a percussive portable power tool, a plunger including an impact surface, and a rotary coupling part, and the second part having a slip-on sleeve, the slip-on sleeve surrounding the plunger coaxially and contacting the impact surface of the plunger, a counterpart to the rotary coupling part and a drill bit permanently connected to the slip-on sleeve;

wherein the shank has at least one elongated groove running along the axis, the at least one groove being closed in an impact direction and against the impact direction.

7. A setting tool comprising:

a first part for driving a drop-in anchor; and a second part placeable on the first part along an axis for drilling a borehole for the drop-in anchor, the first part having a shank for a percussive portable power tool, a plunger including an impact surface, and a rotary coupling part, and the second part having a slip-on sleeve, the slip-on sleeve surrounding the plunger coaxially and contacting the impact surface of the plunger, a counterpart to the rotary coupling part and a drill bit permanently connected to the slip-on sleeve;

wherein the first part has a base having a same outside diameter as the slip-on sleeve and the setting tool further comprising a cylindrical sleeve made of an elastic plastic put over the first part and the second part.

8. A setting tool comprising:

a first part for driving a drop-in anchor; and a second part placeable on the first part along an axis for drilling a borehole for the drop-in anchor, the first part having a shank for a percussive portable power tool, a plunger including an impact surface, and a rotary coupling part, and the second part having a slip-on sleeve, the slip-on sleeve surrounding the plunger coaxially and contacting the impact surface of the plunger, a counterpart to the rotary coupling part and a drill bit permanently connected to the slip-on sleeve;

wherein the second part is pullable away from the first part to release the second part from the first part, the first part thereby being usable for driving the drop-in anchor.

* * * * *